E. H. RUCKLE.
ELECTRICAL HEATING DEVICE.
APPLICATION FILED JUNE 10, 1914.
1,128,366.
Patented Feb. 16, 1915.
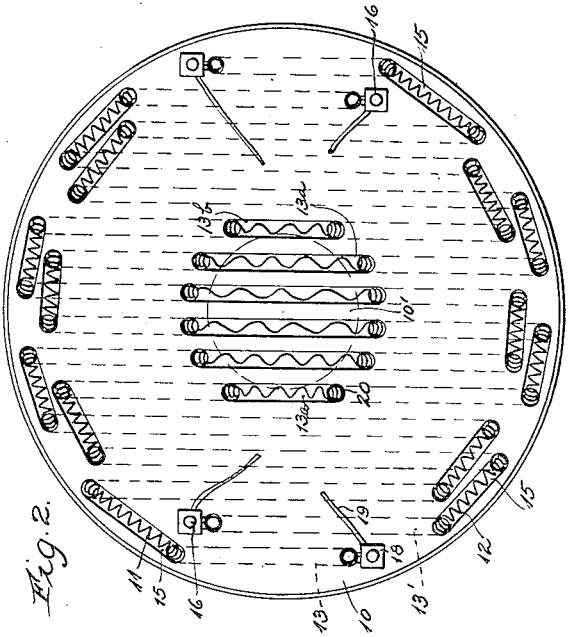
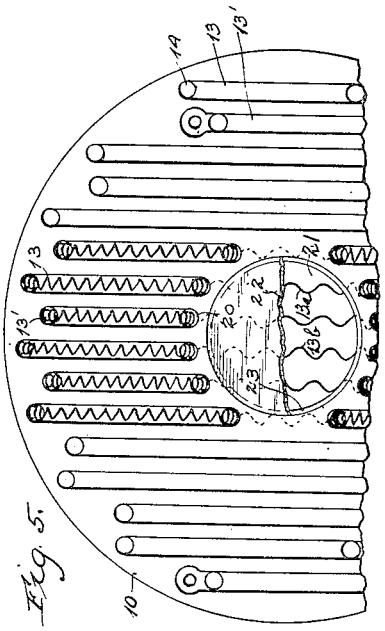
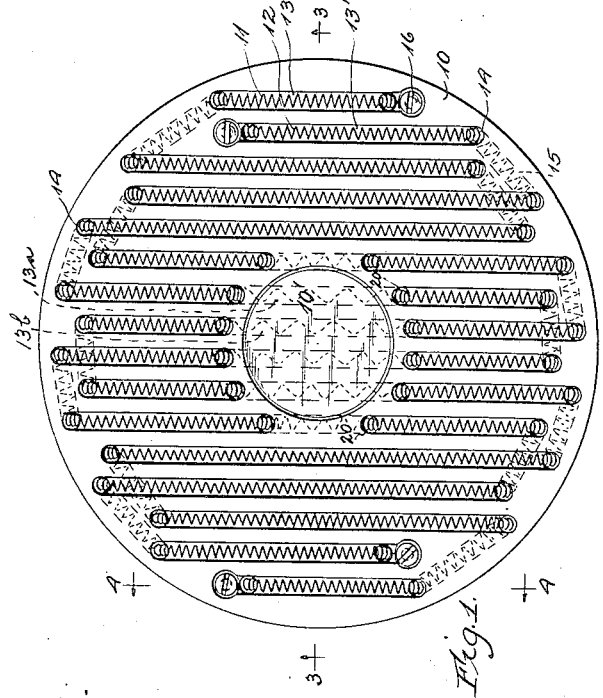
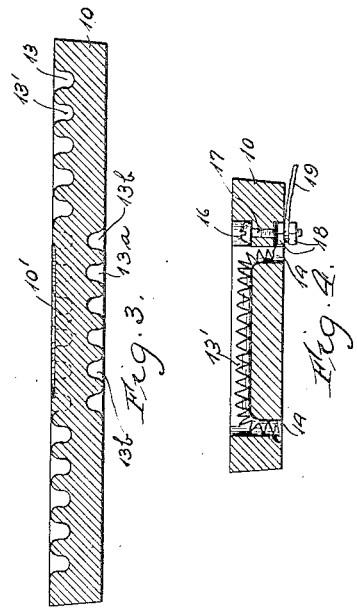
Witnesses,
C. J. Schmidt
L. Bullwinkel.
Inventor,
Edward H. Ruckle
By Offield, Towle, Graves & Offield
Att'ys.

UNITED STATES PATENT OFFICE.

EDWARD H. RUCKLE, OF CHICAGO, ILLINOIS, ASSIGNOR TO HUGHES ELECTRIC HEATING COMPANY, OF CHICAGO, ILLINOIS, A CORPORATION OF ILLINOIS.

ELECTRICAL HEATING DEVICE.

1,128,366.   Specification of Letters Patent.   Patented Feb. 16, 1915.

Application filed June 10, 1914. Serial No. 844,128.

*To all whom it may concern:*

Be it known that I, EDWARD H. RUCKLE, a citizen of the United States, and a resident of Chicago, in the county of Cook and State of Illinois, have invented certain new and useful Improvements in Electrical Heating Devices, of which the following is a specification.

My invention relates to electrical heating devices particularly to an electrical hot plate for use on electrical stoves.

Modern hot plates are usually in the form of supporting blocks of material which has high heat conductivity and which supports, usually in grooves, the resistance conductor which is connected with a current supply circuit. The supporting blocks or plates rapidly absorb the heat generated by the incandescent heating coils and become highly heated. As cooking utensils are set on or directly over the plate uniform radiation or dissipation of the heat from the block is more or less obstructed. Heat radiates more rapidly from the outer sections of the block as it can escape around the edges of the utensil, but at the central portion of the block the heat is more confined, the result being that this central portion becomes heated too highly and the utensil is heated more highly and intensely at its central portion than at its outer portion. Of course, where liquids are heated in the utensil such unequal heating is immaterial, but where solid material is to be heated, as in frying, the material is apt to burn at the center of the pan or utensil and not receive sufficient heat farther away from the center.

My invention therefore has for its general object to produce construction and arrangement in a heating plate that it will heat more uniformly.

More in detail, one important object is to retard, reduce, or prevent heating of the central portion of the block either by omitting heating wires at such part or by reducing the heat capacity of the wires at such part of the block.

Another object is to provide arrangement of the windings which will permit adjustment of the heating capacity at the central portion of the block.

The object is to accomplish all such heat control and regulation and thereby better heat distribution without decreasing the heating capacity of the plate as a whole.

The various features of my invention will be clearly understood by reference to the accompanying drawing in which—

Figure 1 is a plan view of a plate, Fig. 2 is a bottom view thereof, Fig. 3 is a sectional view on plane 3—3, Fig. 1, Fig. 4 is a sectional view on plane 4—4, Fig. 1, and Fig. 5 is a plan view showing a modified arrangement.

On the supporting block 10 two lengths 11 and 12 of spiral heating conductor are extended back and forth across the plate and adapted for connection with a suitable current supply circuit. This principle of the heating coil arrangement is substantially the same as that disclosed in Patent No. 1,068,658, issued July 29, 1913, to George A. Hughes. The block is provided in its upper face with parallel alternate grooves 13 and 13' through which the respective conductors 11 and 12 pass back and forth across the plate, the ends of the grooves having passageways 14 to the back of the block, the respective passageways being connected together by grooves 15 in the under side of the block through which the conductors pass, the conductors being then entirely within the upper and lower faces of the block and thus amply protected. A suitable terminal contact mechanism 16 is provided for each end of the conductors. As shown, a terminal screw 17 passes through the block adjacent each conductor terminal and is threaded to receive nuts 18 for clamping the conductor end and also a lead 19 to the screw.

In accordance with my invention the central part 10' of the block is not provided with heating conductors on its upper side. In the arrangement of Figs. 1 to 4, the channels 13 and 13' terminate at the central section 10' and the conductors in such channels pass to the back of the plate through passageways 20 and then continue through channels 13ª and 13ᵇ extending across the under side of the section 10'. The continuity of the conductors 11 and 12 is therefore unbroken but the conductors pass along the under side of the plate instead of across the top thereof. The result of such construction is that the conductor sections 11 and 11' below the section 10' have their upward flow of heat retarded by the thick material of section 10' and more uniform distribution over the plate results when a utensil is thereon. As shown in Fig. 2, the turns of the conductor sections 11 and 11' may be opened or stretched as desired in order to adjust the heat capacity of the conductors at the central section. If these conductor sections are stretched out sufficiently very little heat will be generated, but as the stretch can be compensated for by bunching of the loops at the ends of the grooves 13ª and 13ᵇ, the total heating capacity of the plate will not be decreased, and the continuity of the conductors 11 and 12 is preserved. Thus adjustment can be readily made to get the desired degree of heat from the central section 10' to a utensil placed over the plate and uniform radiation of heat from the plate to the utensil is assured.

Instead of having the central portion of the block solid as in Figs. 1 to 4, such part could be cut away to leave the central opening or passageway 21 as shown in Fig. 5. The conductor sections 11 and 11' extending across the lower end of this opening could then be adjusted by stretching so that the desired heat reduction will be effected. Instead of leaving passageway 21 entirely open it could be covered by a plate 22 which could be of heat insulating material if desired. The plate could also serve as a name plate. Where such plate is used a shoulder 23 could be provided for a seating therefor. Such removable plate would also allow ready adjustment of the sections 11 and 11' without need of withdrawing the entire plate from its support, it being an easy matter to remove the plate and to bring more or less effective length of wire into the opening 21.

I do not, of course, desire to be limited to the exact construction and arrangement shown as modifications could no doubt be made which would still come within the scope of the invention.

I claim the following:

1. In a hot plate for electric stoves, the combination of a supporting block, and heating conductors arranged on said block throughout the extent thereof, said conductors at the central section of said plate being lower than the remaining sections of the conductors whereby the resistance to upward flow of heat from said central section is increased.

2. A hot plate for electrical stoves comprising a supporting block, a continuous heating conductor extended back and forth across the face of said block in parallel sections, the central portions of the middle sections deflecting through and across the back of the block below the central portion thereof whereby the heat from the central portion of the plate will be decreased.

3. A hot plate for electrical stoves comprising a supporting block having its central portion unchanneled on top but channeled below and having channels in its top between its central portion and the periphery thereof, said channels below said central portion being connected by passageways with the surface channels adjacent said central portion, and resistance conductor sections arranged in the surface channels on said block, the sections in the channels adjacent said central portion deflecting through said passageways and disposed in the channels in the under side of said central portion, the increased distance of said conductor sections in said under side channels from the top of the plate serving to retard and decrease the upward radiation of heat from said central portion.

4. In a hot plate for electrical stoves, the combination of a supporting block in the form of a circular disk, the upper surface of said block with the exception of the central portion thereof being channeled, a resistance conductor arranged in said channels, said resistance conductor deflecting through the block to the under side thereof at said central portion whereby the upward heat radiating efficiency at the central portion of the block will be decreased.

5. A hot plate for electric stoves comprising a supporting block having its upper surface with the exception of the central portion thereof channeled and having the under surface of said central portion channeled, a heating conductor in the form of a continuous coil of wire extended back and forth through said surface channels and deflected adjacent the central portion of the block to extend through said under side channels, the increased thickness of the block at its central portion above the conductor sections in said under side channels acting as a barrier to decrease the upward radiation from said sections.

6. A hot plate for electric stoves comprising a supporting block having its upper surface with the exception of the central portion thereof channeled and having the under surface of said central portion channeled, a heating conductor in the form of a continuous coil of wire extended back and forth through said surface channels and deflected adjacent the central portion of the block to extend through said under side channels, the sections of the conductor in said under side channels being stretched to decrease the number of turns per unit length whereby the heating capacity at the central section of the plate is decreased without decreasing the heating capacity of the plate as a whole.

7. In a hot plate for electrical stoves, the combination of a supporting plate in the form of a circular disk having holes therethrough adjacent its periphery and having holes therethrough around its central portion, parallel surface channels connecting said holes, and two continuous resistance conductors extending back and forth through alternate channels.

8. In a hot plate for electric stoves, the combination of a supporting block having all but the central section thereof channeled on its upper side, and heating conductors passing back and forth through said channels and below the upper surface of the material of said block at said unchanneled section.

9. In a hot plate for electric stoves, the combination of a supporting block, and heating conductors passing back and forth on said block, said conductors at the central section of the block being covered by the material of the block and the balance of said conductors being exposed.

In witness whereof, I hereunto subscribe my name this 6th day of June, A. D., 1914.

EDWARD H. RUCKLE.

Witnesses:
   CHARLES J. SCHMIDT,
   EDMUND G. INGERSOLL.